(12) United States Patent
Faulkner et al.

(10) Patent No.: US 6,385,297 B2
(45) Date of Patent: May 7, 2002

(54) METHOD AND APPARATUS FOR QUALIFYING LOOPS FOR DATA SERVICES

(75) Inventors: Roger Faulkner, Swindon (GB); Kurt E. Schmidt, Burlington, WI (US); Yun Zhang, Wheeling, IL (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/285,954

(22) Filed: Apr. 2, 1999

Related U.S. Application Data

(60) Provisional application No. 60/106,845, filed on Nov. 3, 1998.

(51) Int. Cl.$^7$ .......................... H04M 1/24; H04M 3/08; H04M 3/22

(52) U.S. Cl. ............... 379/1.04; 379/22.02; 379/22.07; 379/24; 379/30; 379/32.02; 324/525; 324/527

(58) Field of Search .............................. 379/1, 6, 9–10, 379/12, 16–17, 22, 24–25, 27, 28, 29, 30, 32; 324/521, 523, 525, 527

(56) References Cited

U.S. PATENT DOCUMENTS

| | | | |
|---|---|---|---|
| 4,620,069 A | * 10/1986 | Godwin et al. | |
| 5,128,619 A | * 7/1992 | Bjork et al. | 324/533 |
| 5,157,336 A | 10/1992 | Crick | 324/613 |
| 5,302,905 A | 4/1994 | Crick | 324/613 |
| 5,400,321 A | 3/1995 | Nagato | 370/14 |

(List continued on next page.)

FOREIGN PATENT DOCUMENTS

| GB | WO 00/27134 | * 5/2000 |
|---|---|---|

OTHER PUBLICATIONS

Goralski, "xDSL Loop Qualification and Testing", IEEE Communications Magazine, May 1999.

"Loop Qualification, Prerequisite for Volume xDSL Deployment?", The TeleChoice Report On xDSL, vol. Two, No. 3, Mar. 1997.

Woloszynski, "It's Here", Bellcore Exchange Magazine, 6/98.

Stewart, "Testing ADSL: The Easier, The Better", America's Network, Dec. 15, 1998.

Hekimian Product Information Release, "Introducing Hekimian's Comprehensive ADSL Test Solution".

Harris Communications, National Communications Forum Presentation, Chicago, IL, Oct. 5, 1998.

Turnstone Systems, Inc., Product Literature & Presentation at Turnstone Systems, Inc., Sep. 1992.

*Primary Examiner*—Binh Tieu
(74) *Attorney, Agent, or Firm*—Teradyne Legal Dept.

(57) ABSTRACT

A method and automatic test system for determining qualification of a twisted pair transmission line to propagate data signals. The method includes measuring phase imbalance in the twisted pair transmission line. The phase imbalance is determined by resistance imbalance in the twisted pair transmission line. The resistance imbalance is determined by applying a common mode voltage to the twisted pair transmission line; and, determining phase imbalance in the twisted pair in response to the applied common mode voltage. The method includes applying a common mode voltage to the twisted pair transmission line; determining phase imbalance if the twisted pair in response to the applied common mode voltage; detecting a peak in the determined phase imbalance; determining a frequency of the detected peak; determining line qualification in accordance with the determined frequency. Methods are provided using series resistive imbalance and phase measurements to discover the type of imbalance existing on a twisted pair transmission line which is unable to support data transmissions. Methods are provided using series resistive imbalance and phase measurements to determine where an imbalance occurs as well as the magnitude of the imbalance.

22 Claims, 12 Drawing Sheets

U.S. PATENT DOCUMENTS

| | | | | |
|---|---|---|---|---|
| 5,402,073 A | * | 3/1995 | Ross | 324/539 |
| 5,404,388 A | * | 4/1995 | Eu | 379/24 |
| 5,436,953 A | | 7/1995 | Nilson | 379/27 |
| 5,465,287 A | * | 11/1995 | Egozi | 379/5 |
| 5,629,628 A | * | 5/1997 | Hinds et al. | 379/6 |
| 5,699,402 A | | 12/1997 | Bauer et al. | 379/26 |
| 5,864,602 A | | 1/1999 | Needle | 379/6 |
| 5,881,130 A | | 3/1999 | Zhang | 379/6 |
| 5,956,386 A | * | 9/1999 | Miller | 379/27 |
| 5,978,449 A | * | 11/1999 | Needle | 379/6 |
| 6,084,946 A | * | 7/2000 | Beierle | 379/30 |
| 6,091,713 A | | 7/2000 | Lechleider et al. | 370/248 |
| 6,154,447 A | * | 11/2000 | Uedder | 370/244 |
| 6,169,785 B1 | * | 1/2001 | Okazaki | 379/27 |

\* cited by examiner

METHOD AND APPARATUS FOR QUALIFYING LOOPS FOR DATA SERVICES

CROSS REFERENCE TO RELATED APPLICATION

Under 35 USC §119(e)(1), this application claims the benefit of prior U.S. Provisional Application 60/106,845, filed Nov. 3, 1998.

BACKGROUND OF THE INVENTION

This invention relates generally to communication networks and more particularly to systems for qualifying telephone lines for data transmission.

As is known in the art, public switch telephone networks, i.e., so-called plain old telephone service (POTS) lines, were originally designed for voice communications which cover a limited frequency bandwidth (i.e., about 4 KHz). Today, it is desired to use the same POTS lines for data transmission. Data signals, however, generally have different frequency characteristics than voice signals. As a result, a POTS line that works well transmitting voice signals might not work well, or at all, for data signals. Telephone companies need to know which lines are suitable, i.e., qualify, and which lines are not suitable for data transmission. Telephone companies also need to know why particular lines are unable to support data transmissions and where such faults occur so they can determine whether the transmission line can be corrected.

The telephone network was originally designed for voice communication. Voice communication covers a limited frequency bandwidth. In some cases, telephone lines were optimized for signals in this frequency range. Even where the lines were not optimized for voice signals, there was no incentive to make the lines operate at other frequencies and often they did not.

Now, it is desired to use those same lines to carry data signals. The data signals generally have different frequency characteristics than the voice signals. As a result, a line that works very well transmitting voice signals might not work well or at all for data signals. Phone companies need to know which lines will work for data signals and use those lines for data.

Line Qualification is the overall ability to make statements about the quality of a subscriber loop as it relates to its ability to deliver voice communications (i.e. POTS), or data services. Disqualification is the ability to make a statement with a high degree of confidence that a subscriber loop will not support a data service without remedial actions. Pre-qualification is the ability to make a statement with a high degree of confidence that a subscriber loop will support a data service without remedial actions.

Telephone operating companies (TELCO's) have two problems to solve in qualifying subscriber loops for delivery of data. The first problem is strategic. Telco's are reluctant to deploy emerging technologies for the delivery of data (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition The second problem is tactical and comes after a Telco has made a decision to deploy a particular technology. There is a need to qualify, either pro-actively or reactively, specific lines for service as that service is requested by subscribers or targeted by the Telco for delivery. For example, if a Telco is to market and deliver the new service, they would like to target those subscriber loops most likely to support the service out of the box and/or with a minimum of work. As another example, a Telco receiving a new service request from a subscriber desires information to either accept or reject that request for new service based on the condition of their line.

4TEL, a product sold by Teradyne, Inc., of Deerfield, Ill., USA, has been used in the past in support of line qualification for delivery of POTS. Techniques in 4TEL lend themselves to the accurate detection and location of conditions which impair both voice and FSK modems. Modern data transmission techniques (such as those used in V.34, V.90, ISDN, and ADSL) encode data in part by shifting the phase of the carrier frequency(s). As such, these technologies rely upon there being fixed end-to-end and differential transmission characteristics (e.g., phase and echo).

A telephone line is made up of a two wire pair, called Tip and Ring. Ordinarily, the Tip and Ring wires should have the same electrical properties. It is desirable for the lines to be balanced. In a balanced line, the resistance, capacitance and inductance of each wire are equal. Imbalances exist if capacitance, inductance, or resistance of one of the wires differ from the other.

A particularly difficult type of condition to identify on a telephone line using single point measurements is called a series resistive imbalance. A series resistive imbalance introduces a differential phase shift between the two wires of the loop. The cause of series resistance is likely due to non-cold welded wire wraps, IDC, or dry solder joints. The oxidation created at the junction of the failing connection causes the series resistance to be unstable, thus modifying the phase shift with time due to changes in current flowing through the junction, further oxidation of the junction, mechanical movement of the junction, and the like. Higher speed modems encode many bits into phase shifts on these carrier frequencies. Thus even minor instabilities of the series resistance cause reduced data throughput, errors, and retraining. With ISDN, the shifts in phase cause energy from one pulse to overlap into the synchronization signal or into the time occupied by another pulse, thus causing inter symbol distortion and/or loss of synchronization. As can be seen, there is quite general degradation of both analog and digital transmission methods, both being susceptible to minor instabilities in series resistance. Stable series resistance, even when values get very high can often be successfully compensated for by internal circuitry in analogue modems or at the U interface for ISDN.

It is important to detect series resistive imbalance because large imbalance values affect POTS by reducing loop current levels. It is possible that the imbalance might be so large, (2 kilo-ohms or more) that seizing a dial tone may not be possible, or the ringing current might not be sufficient to activate the bell circuitry in the telephone or modem. It is equally important to detect imbalance at values below 2 kilo-ohm when data transmission is concerned. Any series resistance and the noise that it causes in terms of phase shift have a detrimental effect on the data throughput that may be achieved on that subscriber loop.

A telephone company would like to pre-qualify a line for high data rate operation, such as ISDN and ADSL. Lines that have been pre-qualified can be leased at a higher price. Lines with imbalances would not be made available for these high data rate services.

SUMMARY OF THE INVENTION

In accordance with the present invention, a method is provided for qualifying a transmission line to propagate data signals. The method includes measuring phase imbalance in the transmission line from a terminating end of the line.

When the wires get out of balance, a human user of the telephone line might notice a degradation in performance in the form of audible noise or reduced voice quality. When the line is used for data transmission, imbalance can limit the data throughput at which the line can operate. However, we have recognized that it is the change of imbalance that has most significant effect on data transmission.

In accordance with another feature of the invention, a method is provided for qualifying a transmission line to propagate data signals. The method includes measuring imbalance in the transmission line from a terminating end of the line.

In accordance with another feature of the invention, a method is provided for qualifying a transmission line to propagate data signals. The method includes applying a voltage in common (i.e., a common mode voltage) to the transmission line; and, determining phase imbalance in the line in response to the applied common mode voltage. The phase imbalance being representative of the difference in phase between the phase of a signal produced in one of the legs in the transmission line and the applied voltage; and, the phase of a signal produced in the other one of the legs in the transmission line and the applied voltage.

In accordance with another feature of the invention, a method for analyzing a transmission line wherein a common mode voltage having a frequency changing over a range of frequencies is applied to a pair of wires of in a transmission line; measuring the phase or magnitude of the signals in each wire of the transmission line relative to the applied common mode voltage in response to the applied common mode voltage over the range of frequencies; determining phase imbalance in the pair of wires in response to the applied common mode voltage over the range of frequencies; detecting a peak in the determined phase imbalance over the range of frequencies; determining a frequency of the detected peak.

In accordance with another feature of the invention, a method is provided for qualifying a transmission line to propagate data signals. The method includes applying a common mode voltage having a frequency changing over a range of frequencies into the transmission line; determining phase imbalance in the transmission line in response to the applied common mode voltage over the range of frequencies; detecting a peak in the determined phase imbalance over the range of frequencies; determining a frequency of the detected peak; determining line qualification in accordance with the determined frequency.

In accordance with still another feature of the invention, a method is provided for automatically qualifying a plurality of twisted pair transmission lines. The method includes feeding signals from a controller to a switch connected to termination ends of the transmission lines, such switch being coupled to a measurement unit. Test signals from the measurement unit are coupled to the transmission lines through the switch selectively in accordance with control signals fed to the switch by the controller. In response to the test signals, the measurement unit isolates resistance imbalance between each of the wires in the selected transmission line. The controller, in response to the isolated resistance imbalance, determines the qualification of the selected transmission line for data signals.

In accordance with still another feature of the invention, a system is provided for automatically qualifying a plurality of transmission lines. The system includes a switch coupled to terminating ends of the plurality of transmission lines. A controller is provided for feeding signals to the switch. A measurement unit is coupled to the switch and the controller. The measurement unit is adapted to feed test signals from the measurement unit to a selected one of the transmission lines through the switch. One of the transmission lines is selected in accordance with a control signal fed to the switch by the controller. The measurement unit isolates resistance imbalance between each pair of wires in the selected transmission line in response to the test signals fed to such selected transmission line. The controller, in response to the isolated resistance imbalance, is adapted to determine the qualification of the selected one of the transmission lines for data signals.

In accordance with another feature of the invention, a method is provided for determining the type of imbalance on a transmission line having a pair of wires. The method includes: feeding a frequency varying signal to the pair of wires; determining the phase imbalance in the pair of wires in response to the applied common mode voltage over the range of frequencies; measuring a frequency at a peak in the determined phase imbalance for a selected paired transmission line; and comparing the determined frequency to a pair of reference frequencies expected with a phase balanced pair of wires to determine the type of imbalance between the wires.

In accordance with yet another feature of the invention, a method is provided for locating the position of an imbalance on a selected test line. The method includes: applying a common mode, frequency varying voltage to twisted pair transmission line; measuring the phase of the voltages on each wire of the twisted pair transmission line relative to the applied voltage; computing the admittance of the twisted pair at the varying frequencies; deriving the capacitance over a selected transmission line from its measured admittance at the varying frequencies; dividing the derived capacitance by the per-unit length capacitance to ground for the transmission line under test to produce a quotient; computing the distance of the imbalance from the produced quotient.

In accordance with still another feature of the invention, a method is provided for locating the magnitude and position of an imbalance on a selected test line. The method includes: determining the presence of a series resistive imbalance; and if present, establishing the location and/or magnitude of the imbalance. The position of the imbalance is located by: applying a frequency varying, common mode voltage to the transmission line; measuring the magnitude and phase of the voltages on each wire of the transmission line; determining phase imbalance in the twisted pair in response to the applied common mode voltage; detecting a peak in the determined phase imbalance; determining a frequency of the detected peak; comparing the absolute value of the magnitude of the measured voltages and the detected peaks to a list of reference data for a transmission line of the type under test; determining the location of the imbalance based on this comparison. The magnitude of the imbalance is determined by: applying a common mode voltage to the twisted pair transmission line; measuring the magnitude and phase of the voltages on each wire of the twisted pair transmission line; determining phase imbalance in the twisted pair in response to the applied common mode voltage; detecting a peak in the determined phase imbalance; determining a frequency of the detected peak; comparing the frequency of the detected peaks to a list of reference data for a transmission line of the type under test; and, estimating the magnitude of the imbalance based on this comparison.

BRIEF DESCRIPTION OF THE DRAWINGS

These and other features of the invention will become more readily apparent from the following detailed description when taken together with the accompanying drawings, in which.

DESCRIPTION OF THE PREFERRED EMBODIMENTS

Figure 1:
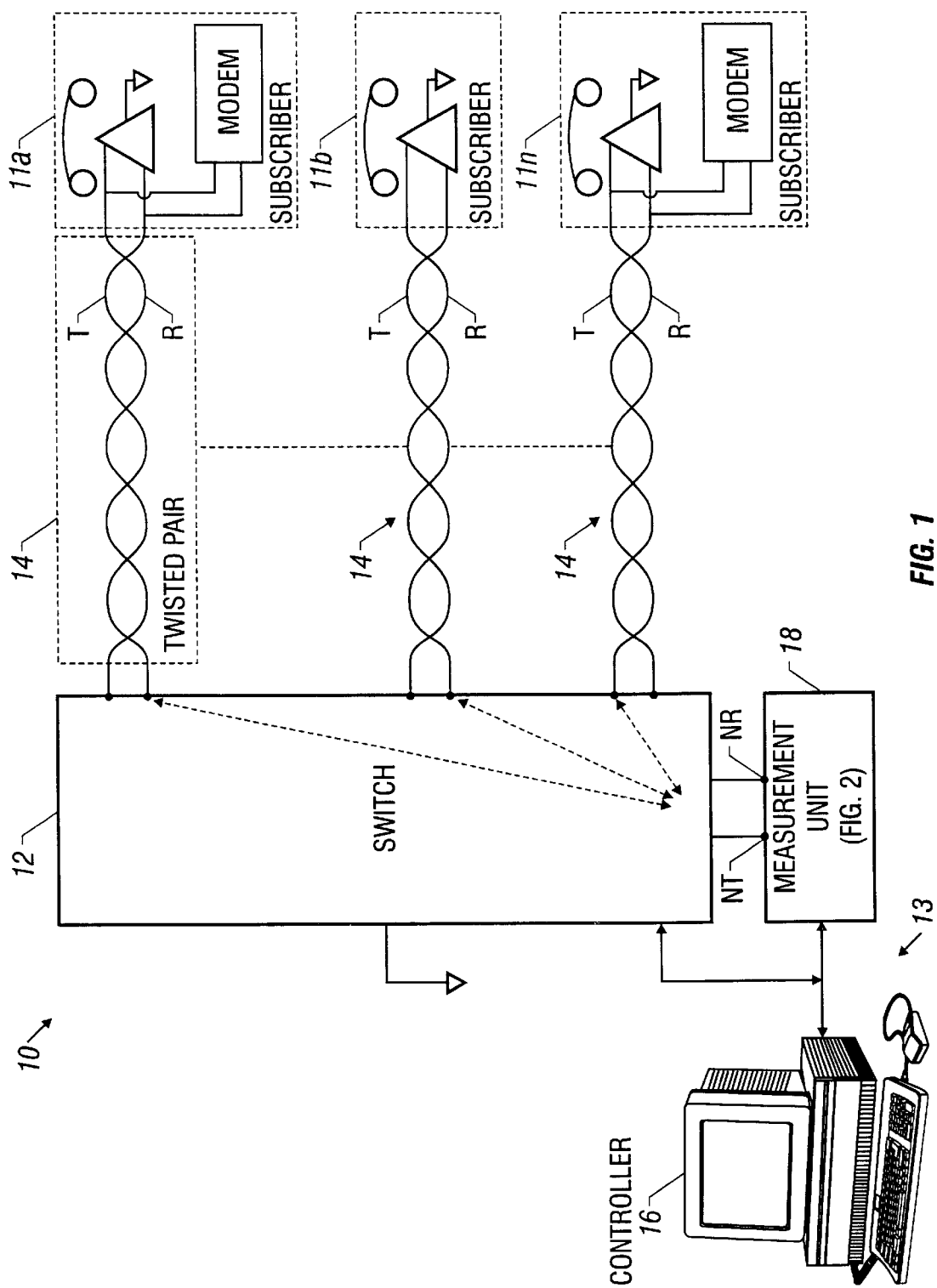
FIG. 1 is a diagram of a POTS system having a twisted pair transmission line data signal qualification testing system according to the invention.

Referring now to FIG. 1, POTS telephone network 10 is shown. The network 10 includes a plurality of subscribers 11 connected to a switch 12 (which is, or is connected to, the central office) through transmission lines 14, which in many instances will be a twisted pair. A centralized test system controller (TSC) 16 is connected to one, or more, measurement units 18, and is adapted to determined whether the twisted pair transmission lines 14 are qualified for data signal transmission. The measurement units 18 are connected to the switch 12, as shown. The test control system controller 16, measurement unit 18, and switch 12 are interconnected as described in U.S. Pat. No. 5,699,402 assigned to the same assignee as the present invention, the entire subject matter thereof being incorporated herein. The measurement unit 18 will be described in detail hereinafter. Suffice it to say here that the unit 18 is adapted to test the twisted pair either on demand, or automatically, from a preprogrammed list of lines. It is noted that a subscriber's transmission loop can be tested from the central office because each measurement unit 18 has access to every subscriber through the switch 12 and the techniques employed herein use test signals that pass through switch 12 without undue distortion. The unit 18 gains access to test a subscribers loop through a switched test bus located in the switching element 12. The switched test bus disconnects the line to be tested from the switch 12, and connects it to the measurement unit 18.

More particularly, a system 13 is provided for automatically determining qualification of the plurality of twisted pair transmission lines 11. The system 13 includes the controller 16 and the measurement unit 18 which are coupled to the switch 12. The switch 12 is also coupled to the terminating ends of the plurality of twisted pair transmission lines 14. The controller 16, here a computerized work station, such as is commercially available from SUN Computers, Inc., is provided for feeding signals to the switch 12 and to the measurement unit 18. The measurement unit 18 will be described in detail in connection with FIG. 2. Suffice it to say here that the measurement unit 18 is coupled to the switch 12 and the controller 16 and that such unit 12 is adapted to feed test signals from the measurement unit 12 to a selected one of the twisted pair transmission lines 14 through the switch 12. The one of the twisted pair transmission lines 14 selected is in accordance with a control signal fed to the switch 12 by the controller 16. Further, measurement unit 18 isolates resistance imbalance between the pair of wires, T and R, in the selected one of the twisted pair transmission lines 14 in response to the test signals fed to such selected one of the twisted pair transmission lines 14, in a manner to be described. The controller 16, in response to the isolated resistance imbalance, is adapted to determine the qualification of the selected one of the twisted pair transmission lines 14 for data signal transmission.

To qualify a subscriber loop for data transmission, the centralized test system controller 16 gathers information from many sources, one of which is the measurement unit 18. The test system controller 16 applies this information using the appropriate hardware and software to a set of rules described below which determine whether a tested line is capable of carrying data transmission signals (i.e, the line is qualified). The following steps are directed by software programmed in controller 16 using known programming techniques.

One method for making a determination about the suitability of a subscriber loop for data transmission, particularly either ISDN or ADSL type data transmission, is the Disqualification method. The Disqualification method allows a telephone company to test its transmission lines to determine which lines may support data transmission, and to disqualify those lines which do not. Under the Disqualification method, the test system controller 16 gathers several factors about the test line including: (1) using any known technique to determine the length of the line; (2) using any known technique to determine the magnitude of any DC metallic faults present on the line; (3) using any known technique to determine the capacitive balance of the line; (4) using any known technique to detect the presence of load coils on the line, such as the one described in U.S. patent application Ser. No. 08/929,842 by Yun Zhang entitled "Fast and Noise-Insensitive Load Status Detection" which is hereby incorporated by reference; (5) using any known technique to determine the composite noise on the line; and (6) using the technique described below to determine the resistive balance on the line. However, it will be appreciated that a line might be disqualified by using less than all of these techniques or by using additional checks.

Figure 4:
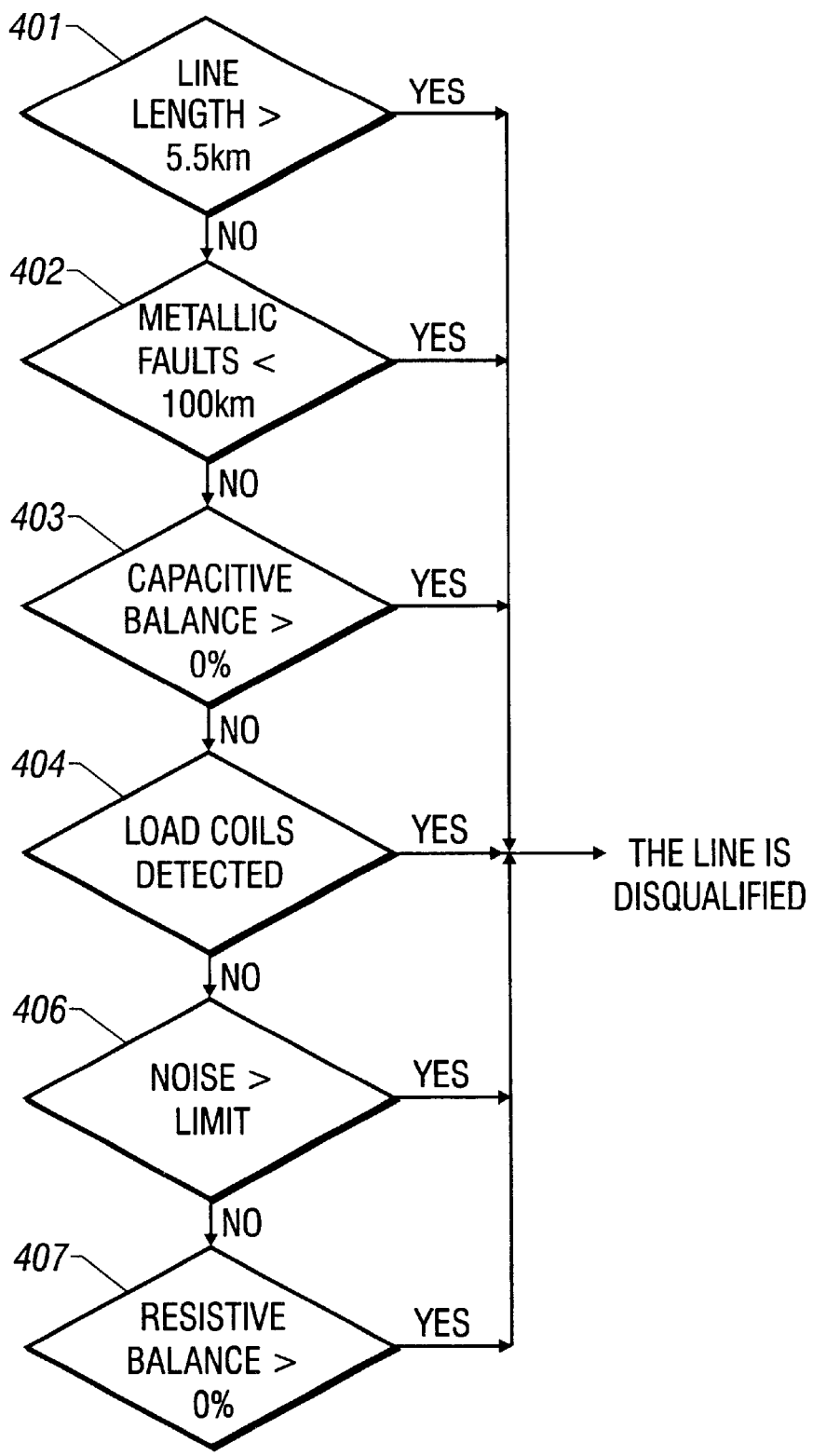
FIG. 4 is a flow chart showing the steps taken to disqualify a transmission line for data service according to the invention.

Referring now to FIG. 4, the test system controller 16 then executes the following rules, using the appropriate hardware and software, to determine whether a line should be disqualified for data transmissions. A line is disqualified if the test system controller determines:

That the line length is greater than some threshold, preferably in the range of 4 to 6 kilometers, and more preferably 5.5 kilometers (step 401); or That metallic faults are less than some threshold, preferably in the range of 80 to 200 kilo-ohms, and more preferably 100 kilo-ohms (step 402); or That capacitive imbalance is greater than some threshold, preferably in the range of 0 to 5% and more preferably greater than 0% (step 403); or That load coils are detected (step 404); or That noise is greater than some threshold, which is preferably empirically determined (step 406); or That resistive imbalance is greater than some threshold, preferably in the range of 0 to 50% or that the series resistive imbalance is unstable, meaning that the measured series resistance imbalance changes more than some threshold since a reference measurement was made.

It will be appreciated that not all of these measurements might need to be made to disqualify a line. Further, it should be appreciated that the thresholds used for each test might be different, depending on the type of data service. For example, ISDN data service can operate at a lower error rate than V.90 at a given level of instability in the series resistive imbalance. It is contemplated that the thresholds will be empirically determined, taking into account such factors as actual experience and the acceptable bit error rate specified by the user or other factors.

Another method for qualifying a subscriber loop for data transmission is the Pre-Qualification method. The Pre-Qualification method allows a telephone company to test its subscriber loops to determine which ones are capable of supporting ISDN and ADSL type data services. Under the Pre-Qualification method, the test system controller 16 makes the same measurements as described above for the Disqualification method.

Figure 5:
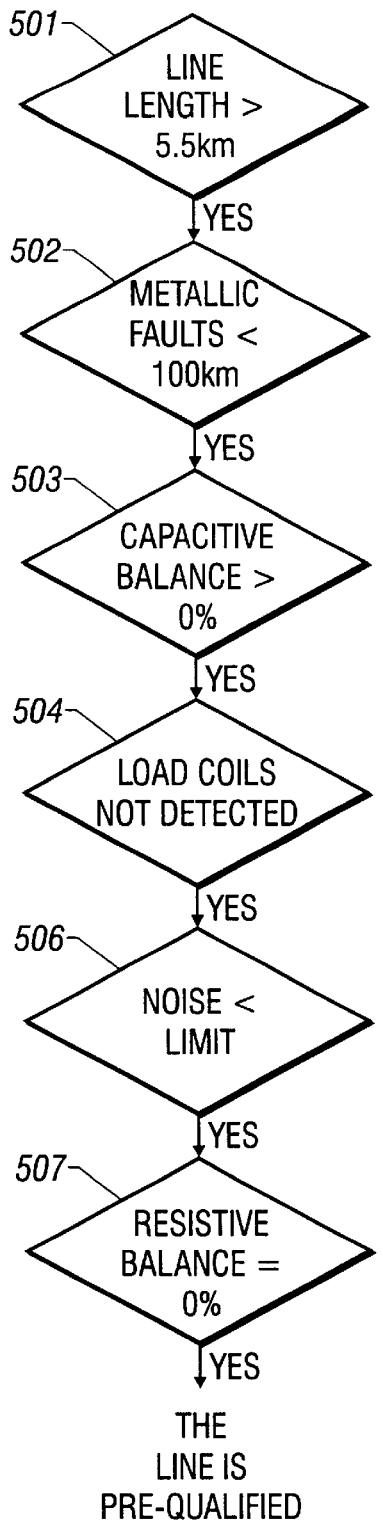
FIG. 5 is a flow chart showing the steps taken to prequalify transmission line for data service according to the invention.

FIG. 5 illustrates the method by which a subscriber line can be pre-qualified for data services. Note that the system of FIG. 1 can, by appropriate programming and commands input into controller 16 test all or some subset of the lines attached to switch 12. Very simply, if a line is not disqualified using the tests described above in conjunction with FIG. 4, it can be concluded with a high degree of confidence that the line is qualified for data services. Notably, all of the measurements needed to qualify the line can be made from one end of the line and can also be made through a switch.

A third method for qualifying a line for data transmission is the V.90 Disqualification method. The V.90 Disqualification approach enables a central test system controller 16 to test a transmission line to determine whether it may handle a V.90 analog modem.

Figure 6:
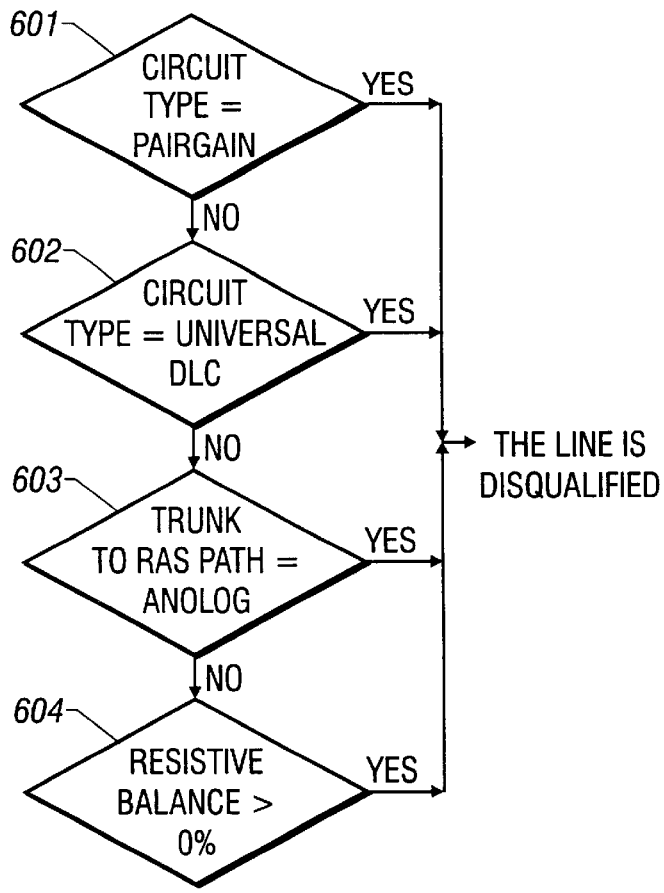
FIG. 6 is a flow chart indicating the steps taken to disqualify a transmission line for V.90 modem service according to the invention.

As shown in FIG. 6, a line will be disqualified for V.90 data transmission if test system controller 16, using the appropriate hardware and software, determines: using any known technique that the line circuit type equals Pair Gain (Step 601); or using any known technique that the line circuit type equals universal DLC (Step 602); or using any known technique that the trunk to RAS path equals analog (Step 603); or using the technique described below that the resistive imbalance is greater than some threshold (step 604), which in a preferred embodiment is about 1,000 ohms or that the imbalance is unstable, meaning that the measured imbalance changes more than some threshold amount. In a preferred embodiment, that threshold is 5%. However, it is contemplated that as the magnitude of the imbalance increases, a lower percentage for instability will be tolerated. Thus, the threshold for stability measurements might be a function of the magnitude of the imbalance. If a line is disqualified for V.90 mode, the modem using that line operates at its slower fall back speed which is commonly called V.34. Again, the operator may not need to check for all of these conditions in every case since again subsets are permissible in some situations.

It is noted that each of these methods (i.e., Disqualification, Pre-Qualification, and V.90 Disqualification) include a measurement of resistance imbalance between the wires in the transmission line. In particular, the stability of the resistive imbalance is very important in qualifying a transmission line for data signals. The lack of stability is particularly harmful for signals in which information is encoded in the phase of the signal. It is also harmful because a shifting imbalance can cause adjacent pulses to smear together. One way to measure the stability of an imbalance is to take multiple measurements over an interval that would be on the order of a second. Changes in imbalance could then be detected from changes in the measurement over that window. A second and potentially faster way to measure the stability of an imbalance is to make a plot of phase of the test line versus frequency. If the resistive imbalance is unstable, the curve will not be smooth (smooth is not used here in the mathematical sense), rather there will be many ripples and possibly discontinuities on the curve. The instable resistance could then be detected though an automatic technique to recognize a curve with these characteristics.

Figure 2:
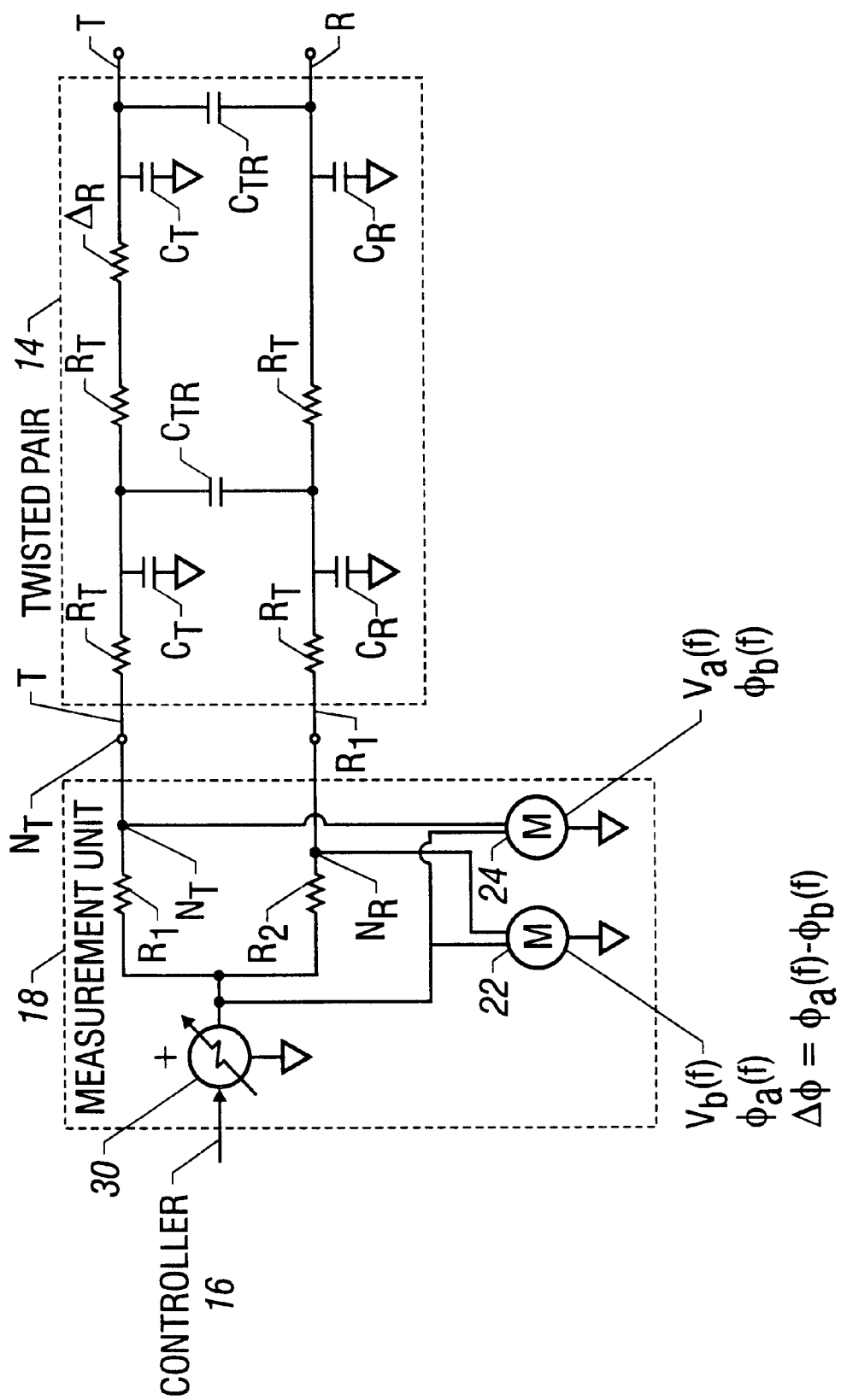
FIG. 2 is a simplified diagrammatical representation of a measurement unit of the test system of FIG. 1 according to the invention, such unit being coupled to a selected one of a plurality of twisted pair transmission lines of the POTS system of FIG. 1, such transmission line being shown by the equivalent circuit thereof.

Referring now to FIG. 2, the measurement unit 18 measures resistive imbalance in each of the wires, R and T of a twisted pair 14. This measurement unit 18 may be used to determine whether the twisted pair 14 qualify for data transmission when such unit 18 is connected to a subscriber's transmission loop, as described above. Here, the measurement unit 18 contains a signal source 30, here a voltage source which is adapted to have its frequency swept in response to a signal fed thereto by the controller 16. Also included in the measurement unit 18 are a pair of balanced (i.e., having equal resistances) resistors R1 and R2, and a pair of voltmeters 22 and 24. The voltage source applies a common mode voltage to the pair of wires T, R of the twisted pair transmission line. More particularly, the voltage source has one terminal reference to ground potential and the other terminal connected in common to the pair of wires, T, R, here through the resistors R1 and R2, respectively, as indicated. Voltmeters 22 and 24, are provided to measure both the magnitude and the phase of the voltage at the node NT of tip wire T and the node NR of ring wire R, respectively.

Figure 3:
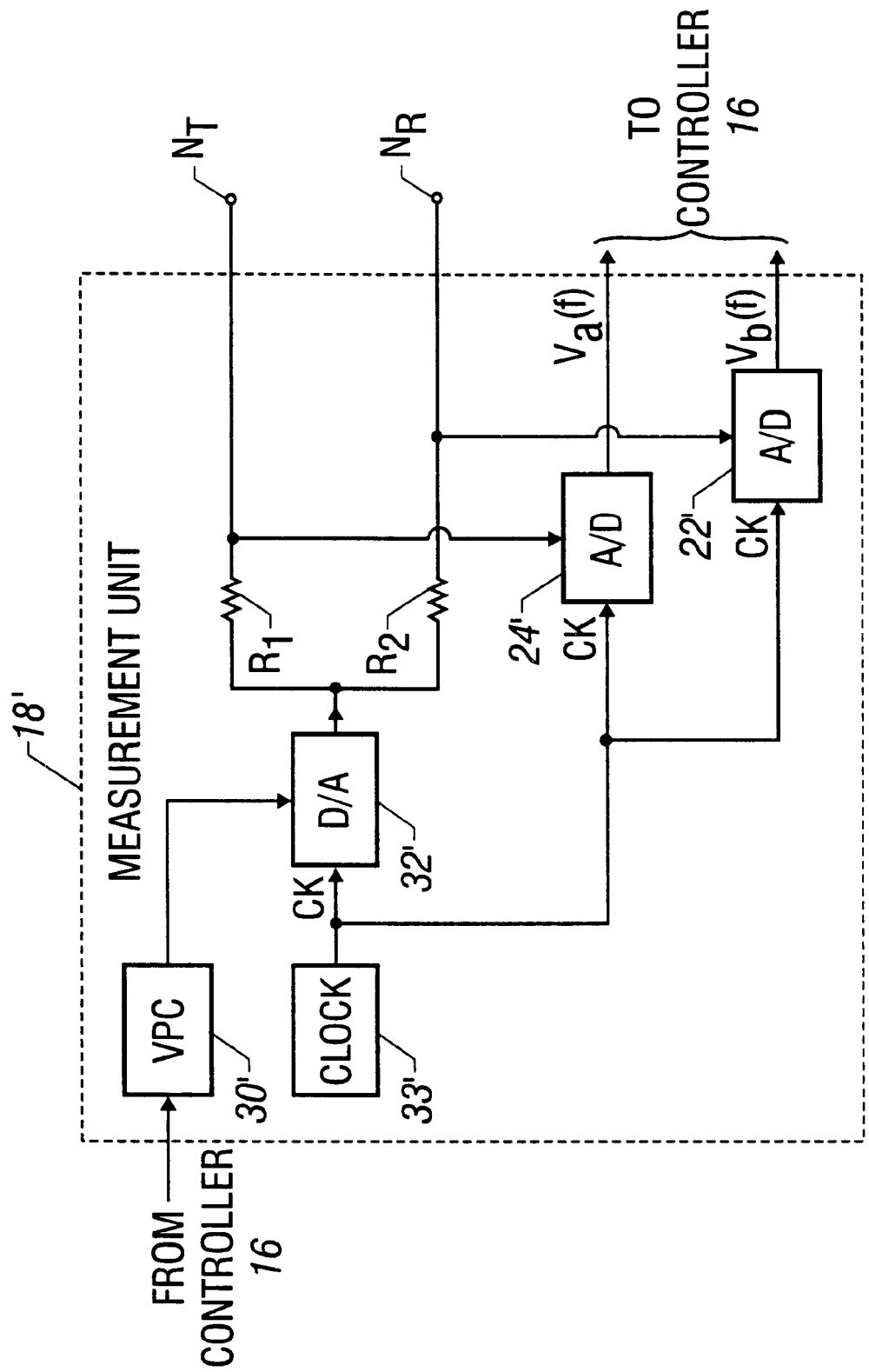
FIG. 3 is a block diagram showing a preferred embodiment of the measurement unit of FIG. 2.

Alternately, measurement unit 18 in FIG. 2 is represented in FIG. 3 as measurement unit 18'. Here, measurement unit 18' contains a signal source 30' which consist of a digital voltage frequency controller 31 coupled to a digital-to-analog converter 32, both connected to a clock 33. The signal source 30' is designed to have it frequency swept in response to a signal fed thereto by the controller 16. Also included in the measurement unit 18' is a pair of balanced resisters R1 and R2, and a pair of analog-to-digital converters 22' and 24', also connected to clock 33. Analog-to-digital converters 22' and 23', measure both the magnitude and phase of the voltage at node NT of tip wire T and the node RT of ring wire R, respectively.

The equivalent circuit for an exemplary one of the twisted pair transmission lines 14 is shown in FIG. 2. It is noted that the ring wire R and the tip wire T include series resistances RR and RT, respectively and shunt capacitances CR, CT, respectively. There is also a capacitance CTR between the tip and ring wires, T and R, respectively, as shown. It is noted that a resistance imbalance AR between the tip wire T and the ring wire R is represented here as shown in ring wire R. To detect and isolate resistive imbalance on a test twisted pair transmission line 14, the following steps are performed under the control of the test system controller 16:

(1) Signal source 30 applies a swept frequency excitation voltage common mode with respect to ground through balance resisters R1 and R2 to each wire R and T which make up the transmission line 14. This signal typically ranges from 0 to 10 volts peak, and is swept in frequency, f, under the control of the controller 16, from 0 to 20 kilohertz.

(2) Voltmeters 22 and 24 measure the resulting magnitude and phase of each signal at nodes T and R with respect to ground. These voltages, as a function of frequency, f, are called Va(f) and Vb(f). The phase imbalance is equal to the difference in phase between: (1) the phase of a signal produced in one of the wires in the twisted pair transmission line with respect to the applied voltage; and, (2) the phase of a signal produced in the other one of the wires in the twisted pair transmission line with respect to the applied voltage.

(3) The phase of the voltage Va(f) is then compared with the phase of the voltage Vb(f) as a function of frequency to determine the phase imbalance between the wires T and R (i.e., the difference in phase, $\Delta\phi$, between the phase of Va(f), $\phi a(f)$, and the phase of Vb(f), $\phi a(f)$, as functions of frequency, f, leaves us the difference in phase, or in other words, the phase imbalance, which equals to $\Delta\phi(f)=\phi a(f)-\phi b(f)$). If a line 14 is balanced, i.e. no resistive, inductive, or capacitive imbalances exist, then the signals measured from wire R will equal the signal measured from wire T in both magnitude, Va(f) and Vb(f), and phase, $\phi a(f)$ and $\phi b(f)$, as functions of frequency. If a line is unbalanced then the signals measured at T and R will not equal in magnitude Va(f) and Vb(f), or phase, $\phi a(f)$ and $\phi b(f)$, or both, as functions of frequency.

(4) If a phase imbalance exists (i.e., $\Delta\phi\neq 0$), the controller 16 proceeds to measure the frequency at which the largest phase imbalance occurs. This value is called the phase peak frequency or Fpk.

Figure 7:
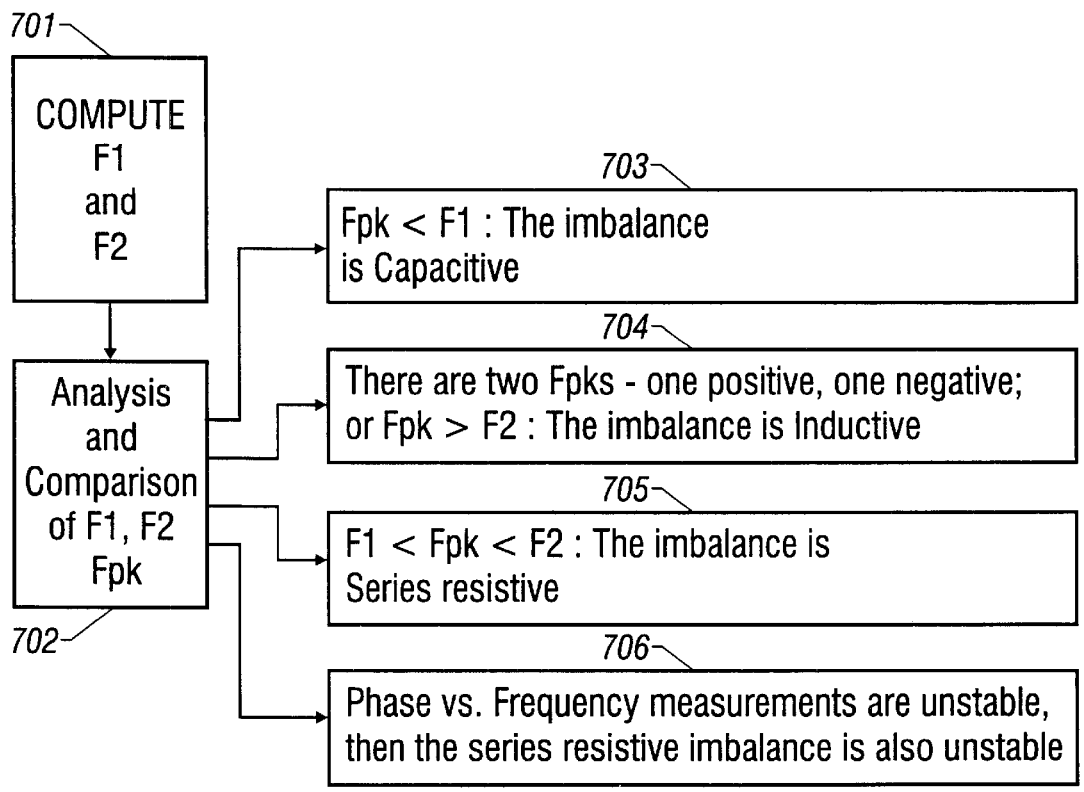
FIG. 7 is a flow chart showing the steps taken to identify the type of imbalance present on a transmission line according to the invention.
Figure 8:
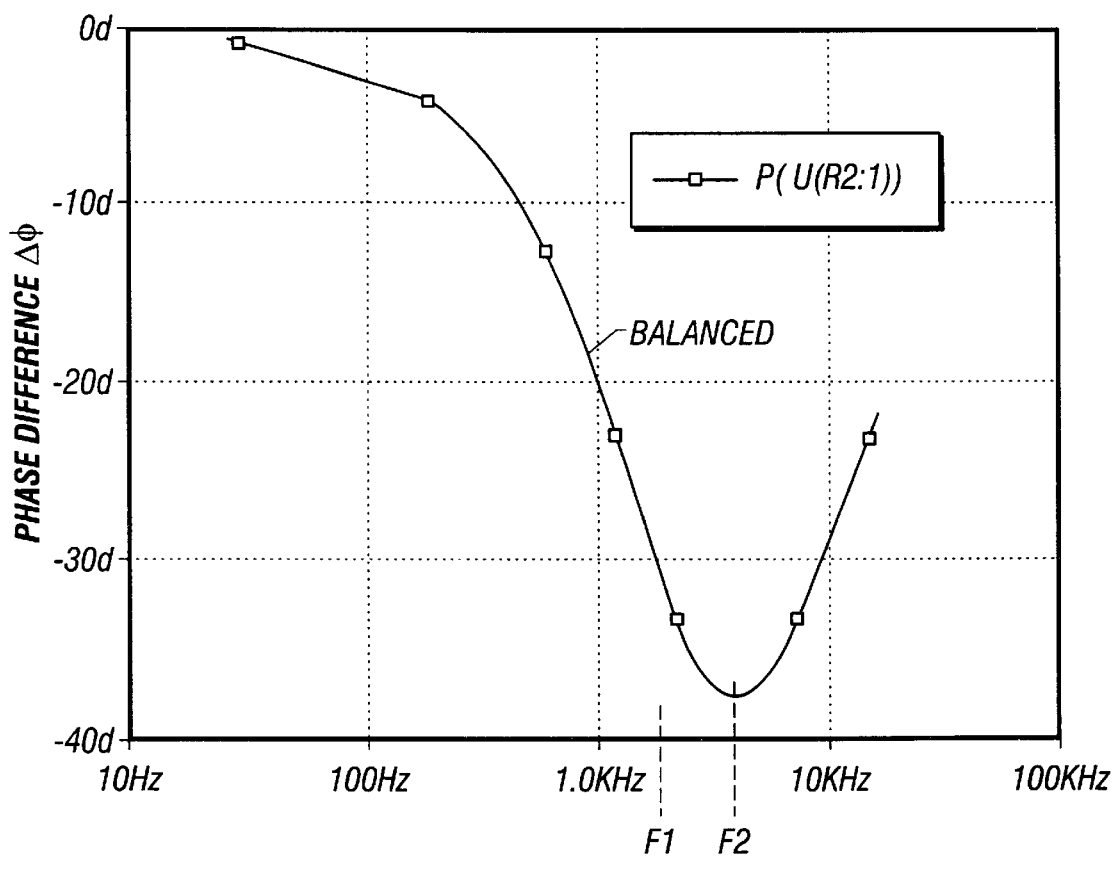
FIG. 8 is a graph showing the relationship between phase and frequency for either of the two wires in a balanced 6 Kilo-foot, 24 gauge, twisted pair transmission line.

Referring now to FIG. 7, to identify the type of imbalance on a test line, should one exist, the controller 16 uses the appropriate hardware and software to complete the following analysis. The controller 16 first establishes two reference frequencies, F1 and F2 (Step 701). F1 and F2 are computed based upon the length of the selected paired transmission line, and aid in determining the type of resistive imbalance present. The lower reference frequency is called F1 and the upper reference frequency is called F2. The frequency F1 is an empirically defined frequency equal to about 0.4 times F2, i.e. F2 divided by 2.5. F2 is the frequency at which a phase peak, Fpk, should occur a balanced wire R or T of a test transmission line 14. For example, FIG. 8 shows the phase of Va(f) versus frequency, $\phi a(f)$, for a 6 kilo-foot length of 24 gauge balanced twisted pair transmission line 14. In this example, F2 is equal to 3.86 kilohertz, and F1 equals roughly 1.5 kilohertz.

For a given line 14 under test, F2 is determined by using one of the following three methods: First, F2 may be measured when the line 14 is in a known good state and that measurement may be stored in a system footprint as described in the above referenced U.S. Pat. No. 5,699,402; second, F2 may be computed from line cable records which identify line lengths and loop records; and third, F2 may be computed from measuring the line length and measuring the loop resistance using any known technique.

Figure 9:
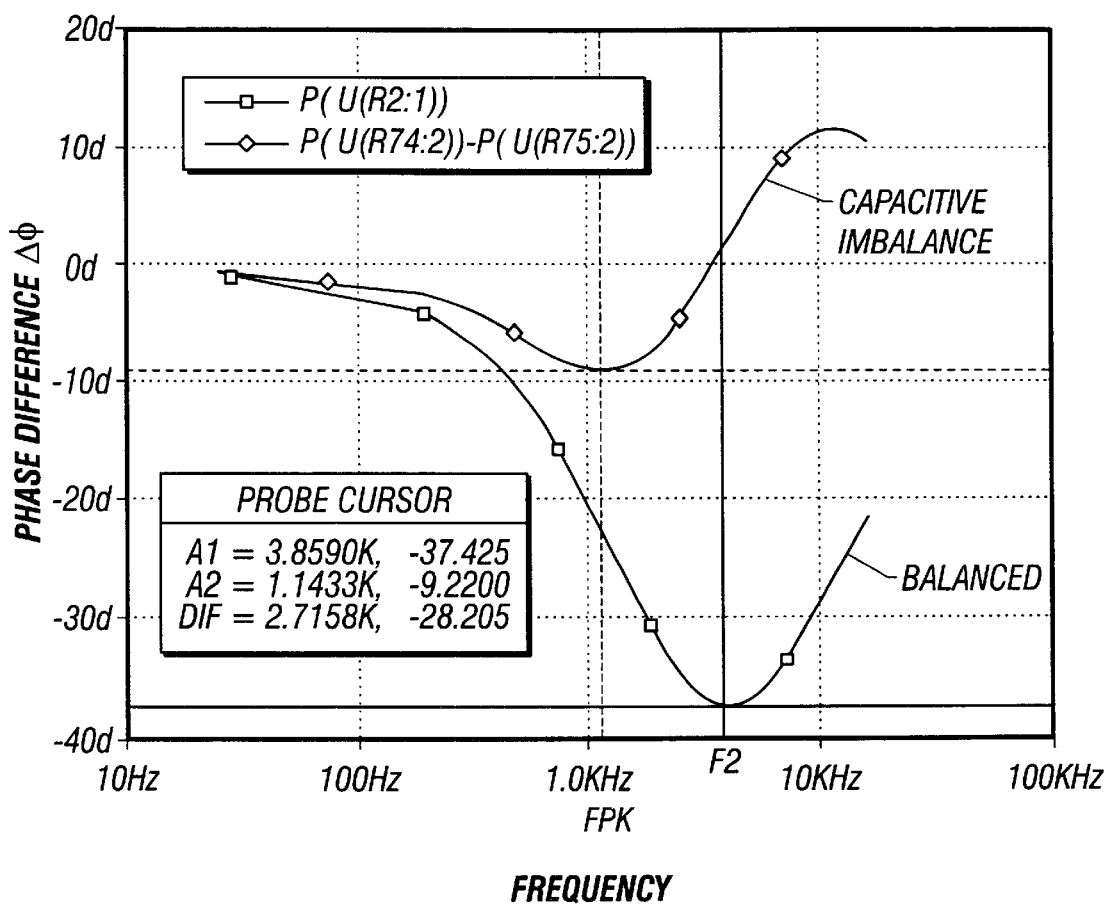
FIG. 9 is a graph showing the phase difference over frequency and the relationship between F2 (balanced) and Fpk for a capacitive imbalance at 3 Kilo-foot on a 6 Kilo-foot 24 gauge, twisted pair transmission line.

Next, the controller 16 identifies the type of imbalance present in the transmission line 14 by comparing the lines 14 measured Fpk, to its previously established F1, F2 frequencies (Step 702). If the imbalance is capacitive, as would be caused by a single leg disconnect, the imbalance can be identified as such by the controller 16 if it finds that Fpk occurs before F1 (Step 703). For example, FIG. 9 shows the computed phase imbalance $\Delta\phi(f)$ between $\phi a(f)$ and $\phi b(f)$ for a resistive imbalance located 3 Kilo-feet from the measuring unit 18 on a 6 Kilo-foot length of 24 gauge twisted paired transmission line, i.e. one leg disconnected, superimposed on the plot of F2 as described above. Here, the Fpk of the tested transmission line occurred before F1 indicating that the imbalance is capacitive and so is identified as such by the controller 16.

Figure 10:
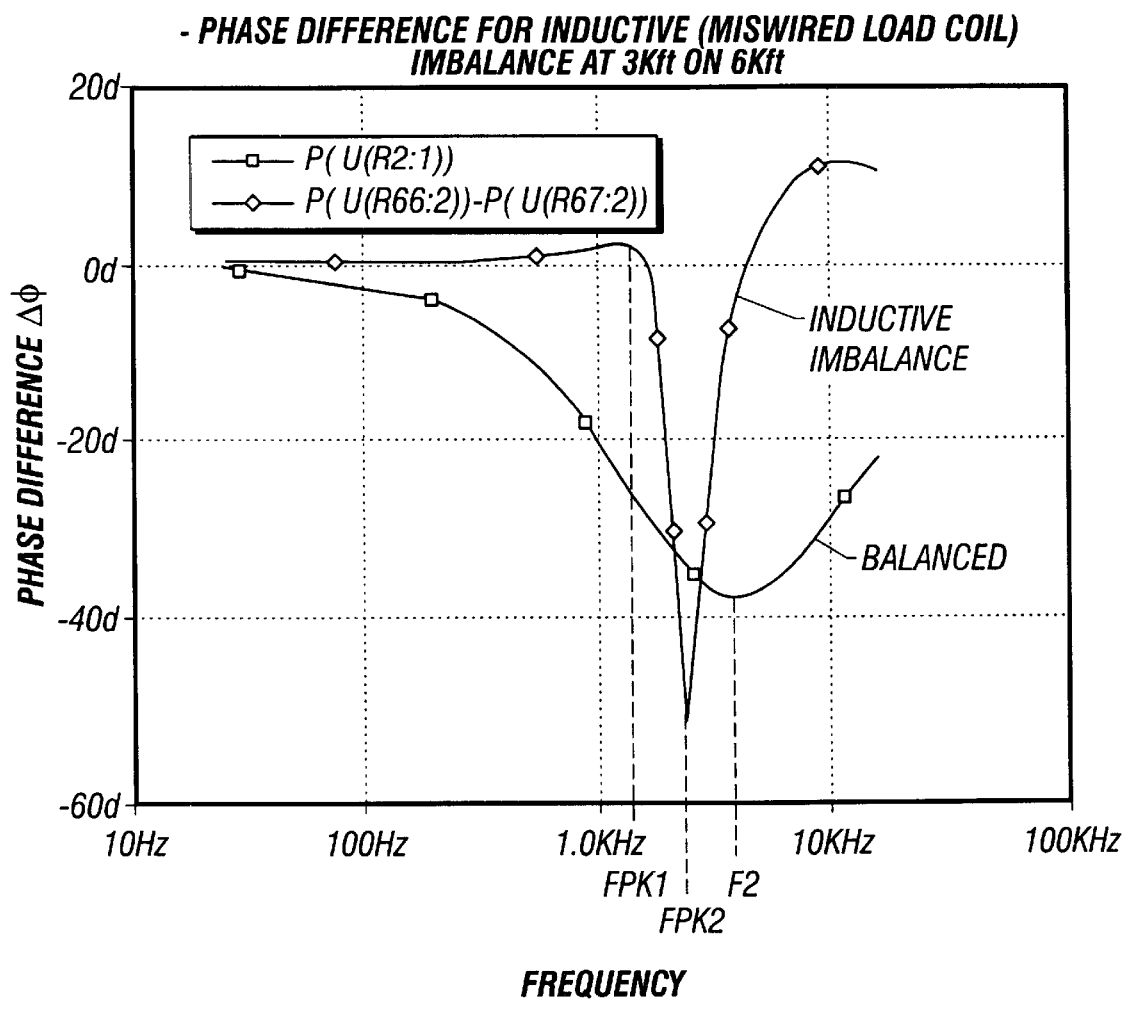
FIG. 10 is a graph showing the phase difference over frequency and the relationship between F2 (balanced) and Fpk for an inductive imbalance at 3 Kilo-foot on a 6 Kilo-foot, 24 gauge, twisted pair transmission line.

Next, if the imbalance is inductive, as would be caused by a miswired load coil, then the controller 16 identifies it as such by determining whether there are two Fpks, one positive and one negative, or by determining, should there is only one Fpk, that Fpk occurs after F2, (Step 704). For example, FIG. 10 shows the computed phase difference, $\Delta\phi(f)$, between $\phi a(f)$ and $\phi b(f)$ for an inductive imbalance at 3 Kilo-feet on a 6 Kilo-foot twisted pair transmission line superimposed on a plot of F2. Here, the Fpks of the tested transmission line occurred twice, at Fpk1 and Fpk2, indicating that the imbalance is inductive and so is identified as such by the controller 16.

Figure 11:
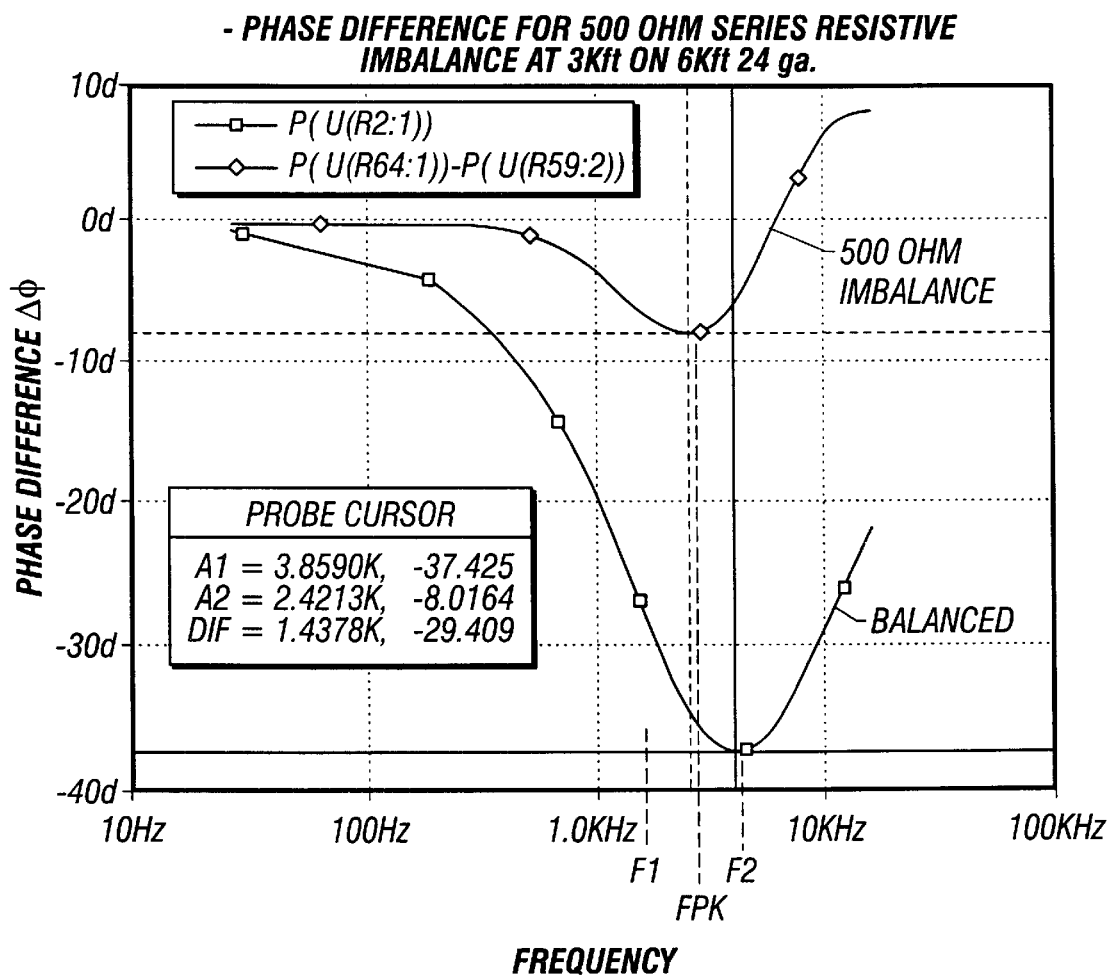
FIG. 11 is a graph showing the phase difference over frequency and relationship between F1, F2 (balanced) and Fpk for a 500 ohm series resistive imbalance at 3 kilo-foot on a 6 kilo-foot, 24 gauge, twisted pair transmission line.

Furthermore, if the imbalance is resistive, as would be caused by unequal series resistance, then the controller 16 identifies it as such by determining whether the Fpk occurs after F1, but before F2 (Step 705). For example, FIG. 11 shows the computed phase difference $\Delta\phi(f)$ between $\phi a(f)$ and $\phi(b(f)$ for a series resistive imbalance of 500 ohms located 3 Kilo-feet from the measuring unit superimposed on a plot of F2. Here, the Fpk occurs after F1 and before F2 indicating that the imbalance is resistive and so is identified as such by the controller 16.

Figure 12:
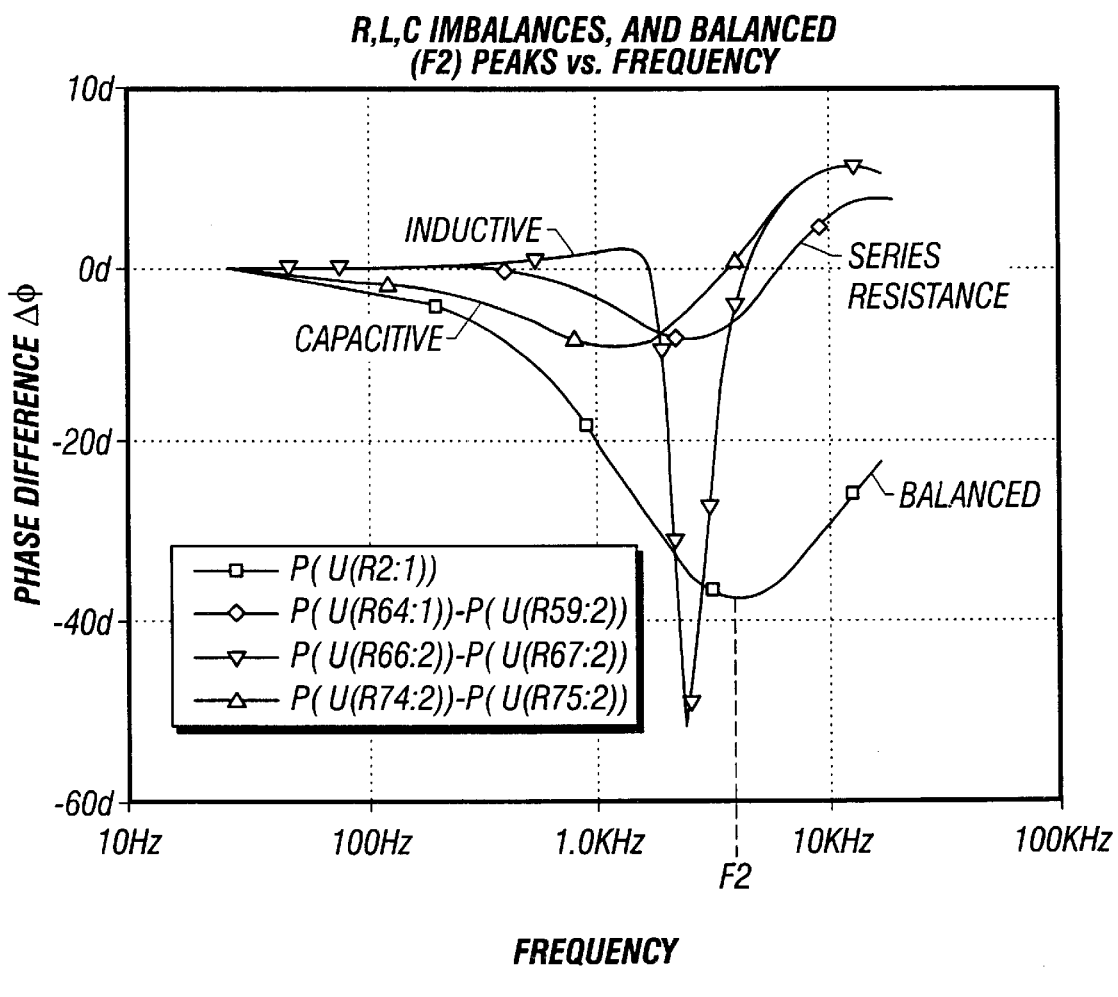
FIG. 12 is a graph showing the phase differences over frequency for resistive, inductive and capacitive imbalances, and a balanced phase on a twisted pair transmission line.

FIG. 12 shows all four conditions, the phase difference $\Delta\phi(f)$ between $\phi a(f)$ and $\phi b(f)$ for a capacitive imbalance, an inductive imbalance or a series resistive imbalance on a twisted pair transmission line 14, as well as $\phi a(f)$ or $\phi b(f)$ for a balanced twisted pair transmission line 14 superimposed on the same graph.

Moreover, the controller 16 can determine when a very unstable (i.e., time varying) series resistive imbalance is present in a twisted pair transmission line by noting that the phase to frequency measurement for line are also unstable (Step 706). Such an unstable situation is seldom true for any other imbalance condition.

After determining the type of imbalance on a test line, the controller 16 may also provide a means to discover the location of the imbalance on a twisted pair transmission line 14. There exists many possible techniques for locating an imbalance on a test line. Below are the two preferred techniques used by the controller 16 to measure the distance to the imbalance from the measuring unit 18.

Figure 13:
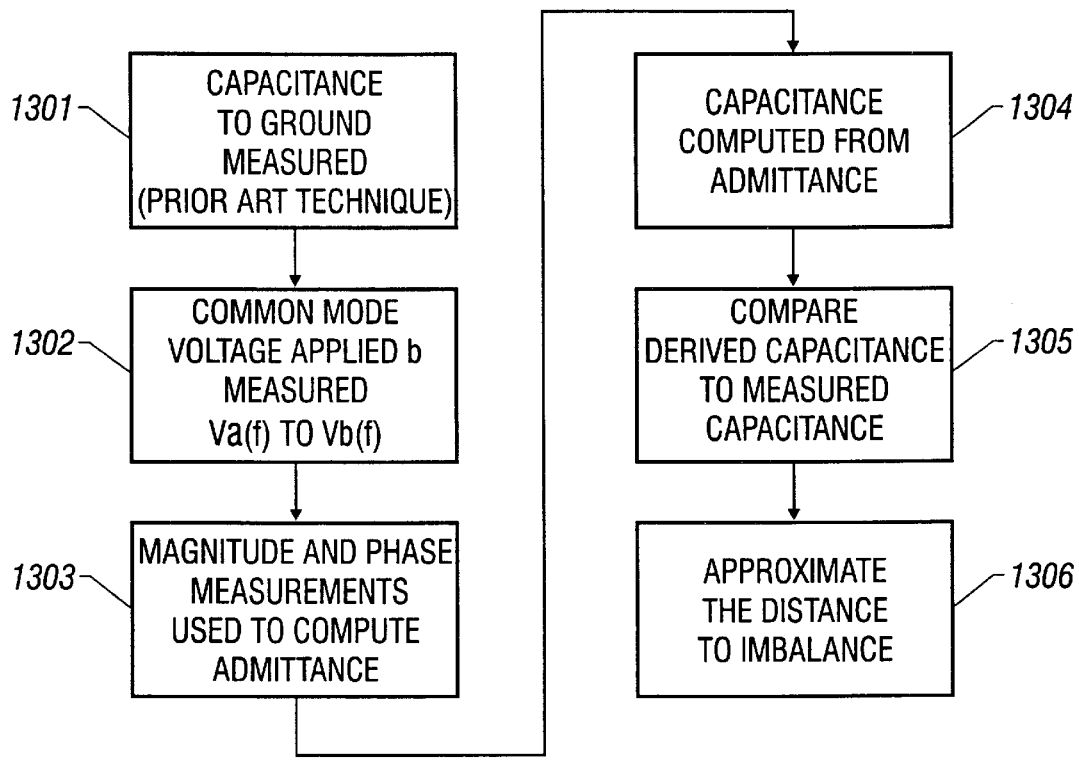
FIG. 13 is a flow diagram indicating the steps needed to locate the position of an imbalance on a transmission line using a measurement of capacitance to ground method according to the invention.

FIG. 13 provides a flow chart for a method used by the test system controller 16 to discover the location of an imbalanced resistance in a twisted pair transmission line 14. This method is called the Measurement of Capacitance to ground method. First, the capacitance to ground of each wire T and R of the twisted pair transmission line 14 is measured using any known technique (Step 1301). Next, an swept (alternating) common mode voltage is applied to the twisted pair transmission line 14 and the resulting magnitude, Va(f), Vb(f), and phase, φa(f), φb(f), of the voltage on wires R and T are measured by measurement unit 18 (Step 1302). Then, these values are used to compute the admittance of the twisted pair transmission line 14 at those frequencies (Step 1303). Next, capacitance for that test line 14 can be directly computed for these frequencies and admittances, (Step 1304). Then the controller 16 compares the capacitance measurements taken in step 1301 with the capacitance measurements derived from the admittance measurements in step 1304, (Step 1305). If there is no series resistive imbalances present on either of the wires then both of the capacitances measured at the lower frequency will be slightly smaller than those measured at the higher frequency. If, however, a series resistance imbalance is present in transmission line 14, the capacitance measured at 8 kilohertz will be significantly smaller than the capacitance measured at 25 hertz. Finally, the controller 16 approximates the distance to the imbalance by dividing the 8 kilohertz derived capacitance by the per-unit-length capacitance to ground for twisted paired transmission line 14 under test and comparing the value found to reference data, (Step 1306).

Figure 14:
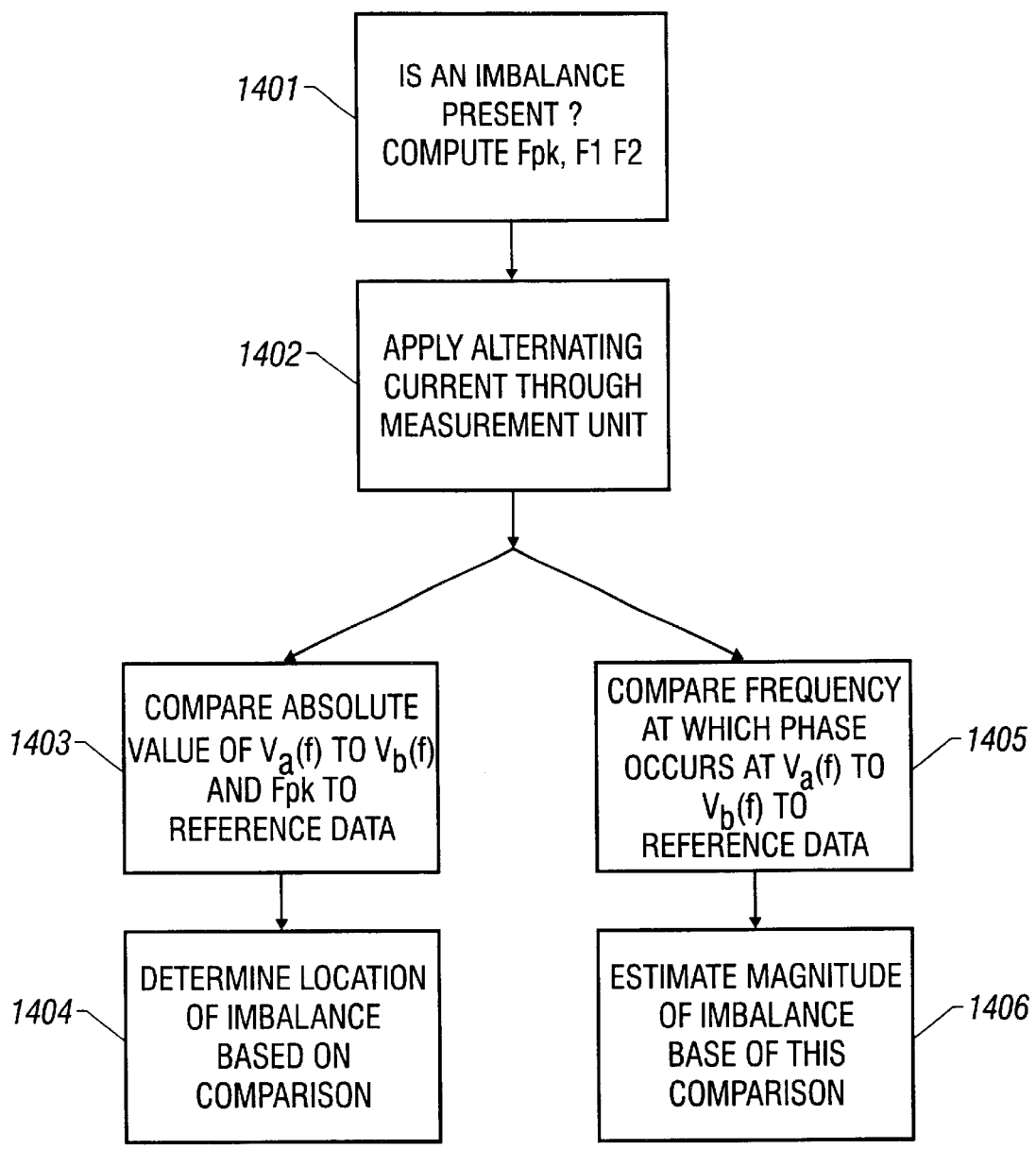
FIG. 14 is a flow diagram indicating the steps needed to locate the position and estimate the magnitude of an imbalance on a transmission line using a phase difference peak method according to the invention.

FIG. 14 provides a flow chart for a second approach used by the test system controller 16 to discover the location of an imbalance on a twisted pair transmission line 14 called the Phase Difference Peak approach. This approach may also be used to determine the magnitude of a series resistive imbalance. First, the controller 16 determines whether a series resistive imbalance is present by comparing Fpk to F1 and F2 as described previously in this patent application (Step 1401). Then, if such an imbalance exists, the controller 16 applies an alternating common mode voltage signal through measurement unit 18 to wires T and R of the twisted paired transmission line 14, (Step 1402). Next, the controller 16 compares the absolute magnitude of the voltage signals, Va(f) and Vb(f), and Fpks for the two signals for wires T and R, to a list of reference magnitudes for a given line construction (Step 1403). Then the controller 16 determines the location of the series resistive imbalance based on a comparison between the measured data and the reference data (Step 1404). The controller 16 compares the frequency at which phase φa(f) and φb(f) occurs to a list of reference frequencies for a model of a twisted pair transmission line 14 of like construction (Step 1405). Then the controller 16 estimates the magnitude of the series resistive imbalance based on a comparison between the measured data and the list of reference frequencies for a model twisted pair transmission line 14 of like construction (Step 1406).

Other embodiments are within the spirit and scope of the appended claims. For example, the invention is described in conjunction with a twisted pair transmission line. The techniques might be applied to any transmission line with at least two legs.

Also, an important aspect of line qualification and line disqualification using measurements taken from a single point is the ability to detect imbalances, particularly series resistance imbalances using single point measurements, and particularly single point measurements that pass through a switch. Time domain reflectometry (TDR) might also be used for such measurements. However, to make TDR measurements through a switch, the pulse widths must be chosen carefully. Appropriate pulse widths are described in the above mentioned U.S. Pat. No. 5,699,402.

Another way to determine imbalance on a transmission line is through the use of data generated in a modem training sequence. When a data connection is established between two modems over a transmission line, the modems undergo a training sequence. In the course of training, the modems can compensate to some extent for series imbalances on the transmission line. Currently, the information that indicates the amount of compensation is not used for testing. However, if the information on compensation needed for imbalance were saved for each line, comparisons could be made to determine whether the compensation has changed over time. If the compensation changed, it would indicate an unstable imbalance. While such data might not be available to pre-qualify a line, it could be used to disqualify a line or to diagnose network faults.

Also, it should be noted that the disclosed embodiment illustrated detecting resistive imbalance from a single point, which is the end of the line connected to a switch. It is not necessary that the test equipment be connected to the network at this point.

What is claimed is:

1. A method for qualifying a transmission line having at least a first leg and a second leg to propagate data signals, comprising:

applying a common mode voltage to the first leg and the second leg at a terminating end of the transmission line; and determining phase imbalance between the first leg and the second leg in response to the applied common mode voltage.

2. A method for analyzing a transmission line having at least a first leg and a second leg comprising:

applying a common mode voltage having a frequency changing over a range of frequencies into the first leg and the second leg of the transmission line;

determining phase difference of signals produced on each leg of the transmission line, in response to the applied voltage, relative to the applied voltage;

detecting a peak in the determined phase difference; and determining a frequency of the detected peak.

3. A method for qualifying a transmission line having at least a first leg and a second leg to propagate data signals, comprising:

applying a common mode voltage having a frequency changing over a range of frequencies into the first leg and the second leg of the transmission line;

determining phase imbalance between the first leg and the second leg in response to the applied common mode voltage;

detecting a peak in the determined phase imbalance; and determining a frequency of the detected peak.

4. A method for automatically qualifying a plurality of transmission lines, each line comprising a plurality of legs, comprising:
feeding signals from a controller to a switch connected to termination ends of the transmission lines;
coupling test signals to the transmission lines through the switch selectively in accordance with control signal fed to the switch; and
detecting resistance imbalance between each of the legs in a selected one of the transmission lines in response to the test signals.

5. A system for automatically qualifying a plurality of transmission lines, each line having a pair of lines, such system comprising:
a switch coupled to terminating ends of the plurality of a transmission lines;
a controller for feeding signals to the switch;
a measurement unit coupled to the switch and the controller, such measurement unit being adapted to provide test signals from the measurement unit to a selected one of the transmission lines through the switch, such one of the transmission lines being selected in accordance with a control signal fed to the switch by the controller, such measurement unit detecting resistance imbalance between each of a pair of lines in the selected one of the transmission lines in response to the test signals fed to such selected one of the transmission lines; and
wherein the controller, in response to the detected resistance imbalance, is adapted to determine qualification of the selected one of the transmission lines for data signals.

6. The method for analyzing a transmission line recited in claim 2 including:
comparing the frequency of the detected peak in the determined phase with one or more reference frequencies.

7. The method for analyzing a transmission line recited in claim 2 including:
determining, in response to the frequency comparison, whether a resistive imbalance is present on the transmission line.

8. The method for analyzing a transmission line recited in claim 2 including:
determining, in response to the frequency comparison, a type of resistive imbalance present on the transmission line.

9. The method for analyzing a transmission line recited in claim 2 further including:
determining, in response to the frequency comparison, presence of a capacitance imbalance on the transmission line.

10. The method for analyzing a transmission line recited in claim 2 further including:
determining, in response to the frequency comparison, presence of an inductive imbalance on the transmission line.

11. The method for analyzing a transmission line recited in claim 8 further including:
determining whether the resistive imbalance is a series resistive imbalance.

12. The method of analyzing a transmission line recited in claim 11 further including:
determining whether the resistive imbalance varies with time.

13. The method for analyzing a transmission line recited in claim 7 further including:
computing admittance of the transmission line at varying frequencies;
deriving capacitance of the transmission line from the computed admittance;
dividing the derived capacitance of the transmission line by per-unit length capacitance for type of transmission line under test to produce a quotient; and
locating the position of the imbalance on the transmission line from the produced quotient.

14. The method for analyzing a transmission line recited in claim 7 further including:
measuring the magnitude of the voltage on each one of the legs of the transmission line in response to the applied voltage;
comparing the absolute value of the measured magnitude voltage and a detected frequency peak with a list of reference data; and
determining the location of the imbalance based on the comparison.

15. The method for analyzing a transmission line recited in claim 7 further including:
comparing the frequency of a detected peak to a list of reference data; and
determining the magnitude of an imbalance on the line based on the comparison.

16. A method of analyzing a telephone line having at least a first leg and a second leg, the method comprising:
(a) applying test signals to the first leg and the second leg to determine, at a first frequency and a second frequency;
(i) the capacitance between the first leg and ground; and
(ii) the capacitance between the second leg and ground;
(b) determining that no resistive imbalance exists when:
(i) the difference between the capacitance between the first leg and ground measured at the first frequency and the second frequency is below a threshold; and
(ii) the difference between the capacitance between the second leg and ground measured at the first frequency and the second frequency is below a threshold.

17. The method of claim 16 additionally comprising identifying an imbalance when the difference between the capacitance between one of the legs and ground measured at the first frequency and the second frequency exceeds a threshold.

18. The method of claim 16 additionally comprising identifying which of said first leg and said second leg contain the imbalance as being the leg in which the difference between the capacitance between that leg and ground measured at the first frequency and the second frequency exceeds the threshold.

19. A method of qualifying a transmission line having at least a first leg and a second leg to propagate data signals comprising:
(a) providing a test signal on the first leg and the second leg;
(b) measuring signals on the first leg and the second leg to determine the phase imbalance on the transmission line;
(c) qualifying the transmission line to propagate data signals based on the phase imbalance being below a threshold.

20. A method of qualifying a transmission line having at least a first leg and a second leg to propagate data signals comprising:

(a) providing a test signal on the first leg and the second leg;

(b) measuring signals on the first leg and the second leg to determine the resistive imbalance on the transmission line;

(c) qualifying the transmission line to propagate data signals based on the resistive imbalance being below a threshold.

21. The method of automatically qualifying a plurality of transmission lines of claim 4 additionally comprising disqualifying a line when the detected resistance imbalance varies over time by an amount greater than a threshold.

22. The method of qualifying a transmission line of claim 20, additionally comprising:

(a) determining additional parameters of the line; and (b) eliminating lines from consideration for qualification when the additional parameters are outside of acceptable limits.

* * * * *